United States Patent Office 3,227,527
Patented Jan. 4, 1966

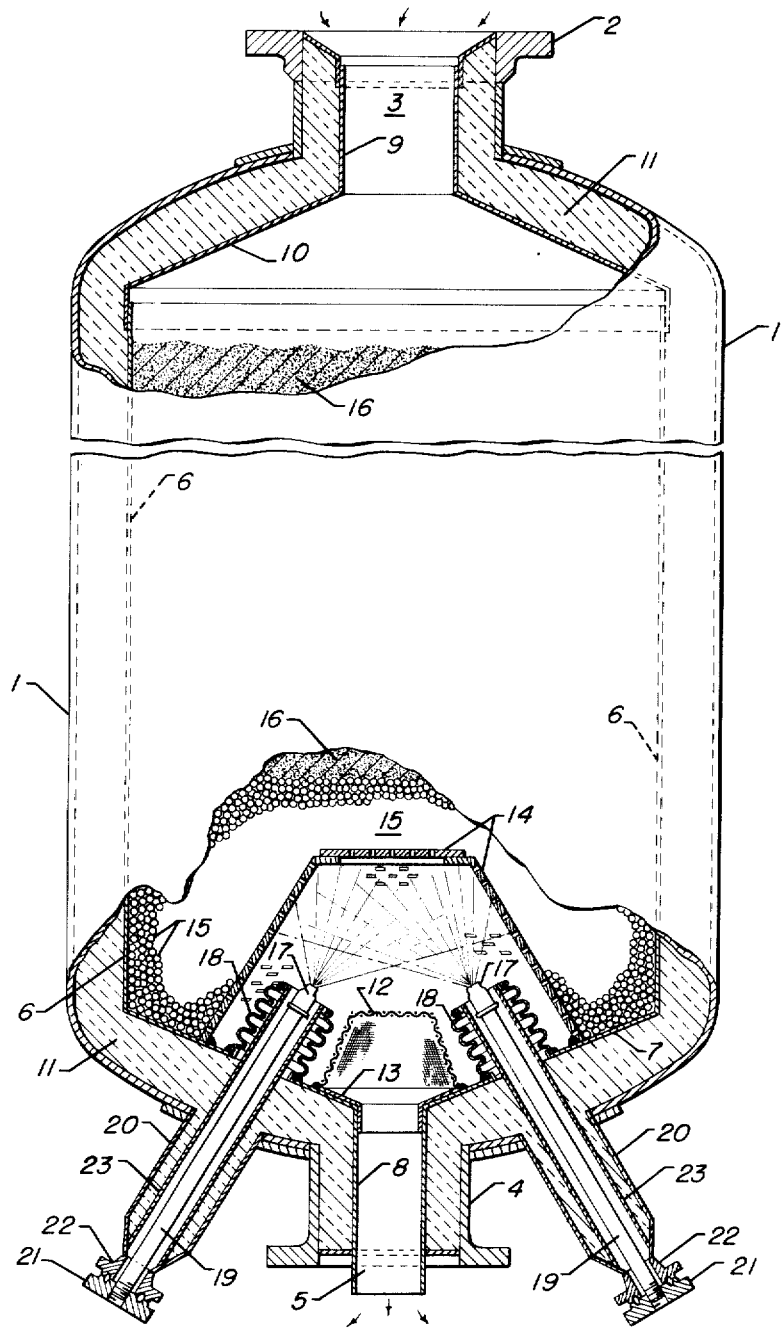

1

3,227,527
HIGH TEMPERATURE REACTOR
Walter W. Heinze, Chicago, and Raymond E. Menger, Des Plaines, Ill., assignors to Universal Oil Products Company, Des Plaines, Ill., a corporation of Delaware
Filed Mar. 4, 1963, Ser. No. 262,699
2 Claims. (Cl. 23—288)

This application is a continuation-in-part of our earlier filed application Serial No. 42,177 filed July 11, 1960, now abandoned.

The present invention relates to a high temperature internally insulated reactor having means for quenching a product stream therein. More particularly, the invention is directed to an improved lined reactor design which provides for quenching a high temperature product stream within the interior thereof and with a minimization of internal effects to the walls of the reactor.

Usual types of chambers or reactors having a product stream which is quenched have provisions for introducing the quench fluid directly into the outlet nozzle or a conduit downstream from the chamber itself, particularly where the chamber is adapted to retain a bed of catalyst or other subdivided material. However, where a relatively cold quench fluid is mixed with a high temperature product stream, having a temperature of 800° F. or more, there may be thermal shock or metal expansion problems which make it undesirable to effect the intermixing of a quench stream in an unprotected zone.

It is a principal object of the present invention to provide a design and arrangement which utilizes in part the interior insulation or lining of a high temperature reactor to preclude undesirable metal stresses in the reactor walls or in piping connecting to the outlet end of the reactor, by introducing a quench stream into a specially designed quench zone within the interior of the chamber itself.

It is a further object of the present invention to provide an efficiently operating quench section within an interior portion of a lined and insulated particle retaining chamber by means which effects the intermixing of the quench medium into the product stream in a uniform rapid manner.

Briefly, the present improved high temperature lined reactor having an interior quench section, comprises in combination, a confined pressure-tight housing having an upper fluid inlet and a lower fluid outlet, a sectionalized liner attached to and spaced from the interior wall of the housing and insulation therebetween, a first perforate member mounted interiorly over the fluid outlet, a second perforate member spaced from and positioned over said outlet and said first perforate member, at least one fluid distributing spray member positioned between the perforate members and directing a sprayed quenching fluid into the space between said perforate members, a quench fluid conduit means through the housing to the fluid distributing member whereby a quenching fluid may be intermixed with the fluid passing through the perforate members to said fluid outlet.

A preferred construction and arrangement of the improved reactor provides that conical or frusto-conically shaped screen member be mounted interiorly over and around the fluid outlet and further, that the fluid distributing spray member or members be designed and positioned to spray the quenching medium entirely across the space between the spaced perforate members and in a manner that permits a mixed fluid phase to descend uniformly down around the periphery of the encompassed screen such that as the product stream passes through the screen to the fluid outlet it is subjected to further intermixing with the quenching medium.

2

The improved reactor of the present design is of particular advantage in connection with high temperature hydrocarbon conversion operations which are carried out in the presence of a subdivided catalyst or other contact material maintained within a contact zone, where such conversion product stream is subjected to quench or intermixing with a stream after contact within the reactor chamber itself. The improved design is also of advantage in connection with reactors used for conversions carried out in the presence of hydrogen. It may be noted that carbon steel at high temperature conditions, say above about 500° F., is permeable to hydrogen so that it is necessary to utilize alloys at these high temperatures, or alternatively, make use of a suitable refractory insulation on the inside of the reactor chamber such that the chamber wall has a temperature substantially below 500° F. to preclude hydrogen attack and permeation. Thus, a reactor of the present type may well be utilized in connection with high temperature hydrocarbon conversion operations such as hydrocracking, hydrogenation, hydrodealkylation and the like where it is necessary to maintain a hydrogen atmosphere at high pressure and high temperature conditions.

The construction and arrangement of the lined and insulated reactor, providing a quench section within the interior thereof, may be better described and explained by reference to the accompanying drawing and the following description thereof.

The present drawing is a diagrammatic sectional elevational view of one embodiment of a reactor and shall not be considered limiting as to the scope of the invention.

In the drawing, an outer shell or housing 1 is provided with an upper flanged nozzle 2 providing an inlet passageway 3, and a lower outlet nozzle 4 providing a fluid outlet or passageway 5. Spaced from the interior wall of the housing 1 is a metal wall liner section 6, which in the present embodiment, is supported from and connects with the lower liner sections 7 and 8, the latter lining the fluid outlet or passageway 5 through nozzle 4. At the upper interior portion of the housing is a liner section 9 which joins with and is supported from the flange of nozzle 2 having the inlet passageway 3. Also, attached to the lower end of the liner section 9 is an outwardly flared section 10 which has a lower flanged portion that slips over the upper end of the wall liner section 6, providing in effect a slip joint for internal expansion of the liner sections.

In the space between the liner sections and the interior face of the housing 1 is provided a suitable high temperature resistant refractory type of insulation 11 suitable to preclude the conversion temperature having a detrimental effect upon the chamber or housing 1. The insulating material 11 may, for example, be an insulating type of concrete applied over suitable anchoring means which may be welded or otherwise attached to the interior wall portions of the housing 1. It is not intended to limit the present invention to any one type of insulation or refractory concrete. Actually, combinations of low density insulating materials and higher density refractory concretes applied thereover may be utilized in various embodiments of the high temperature reactor. Further, in connection with some conversion operations and within various modified embodiments of the improved reactor, the interior metal liner sections may be eliminated, particularly where hard surface refractory lining material is utilized.

Extending above and over the outlet passageway 5 within nozzle section 4, is a frusto-conical screen, or perforate member 12. The present embodiment provides a short funnel-shaped section 13 attached to the lower periphery of perforate section 12 and resting on the lower central portion of the liner section 7 so as to maintain proper positioning and alignment of the member 12. Spaced from and superimposed over screen member 12 is a larger frusto-conical section 14 which is also a perforate member providing for the uniform distribution and flow of the vapor stream being contacted in the chamber to the outlet zone thereof. The perforate member 14 is also, in the present embodiment, utilized to support and preclude the passage of subdivided solid contact material into the quench zone of the chamber. The present arrangement indicates a lower packed section comprising a bed of high temperature resistant material, such as ceramic or alumina balls 15 positioned around perforate member 14, while superimposed thereabove is a bed of subdivided solid catalyst particles 16 adapted to aid in the particular conversion being undertaken within the reactor.

Positioned between the perforate member 14 and perforate section 12 are a pair of opposing fluid distributing nozzles 17 directing quenching fluid upwardly over substantially the entire inner periphery of the outer perforate member 14. Thus, preferably, wide angle spray nozzles 17 are utilized to give a wide distribution traversing the entire inner space between perforate members. The quenching fluid and hot product stream then pass in a mixed phase downwardly over the entire outer surface of the screen member 12 such that further mixing and quenching is attained. Connecting with the fluid distributing nozzles 17 are quench fluid inlet lines 19 which pass through nozzles 20 that are attached to and extend from the lower head of the housing 1. In each case, a flange member 21 attached to the line 19 in turn provides means for supporting such line to a flange 22 on nozzle 20.

In the operation of the reactor unit, the high temperature vaporous product stream, resulting from contact within beds 16 and 15, is passed through the perforate member 14 in a uniform flow to the perforate member 12 for subsequent discharge through the passageway 5. A substantially cooler quench stream is introduced through lines 19 to distributing nozzles 17 which each effect a wide spray pattern within the clear space between perforate members 12 and 14 as well as a flow over the inner surface of the conically-shaped perforate member 14 to become intermixed with the vapors of the conversion product stream. The quench and product streams also flow in an intermixed phase downwardly through the perforate wall of the member 12 and into the interior portion thereof for subsequent discharge in a reduced temperature vaporous state.

It is to be noted that the present embodiment provides that the perforate members 12 and 14 be of conical, or frusto-conical shaped sections, however, other forms and shapes may well be used within the scope of the present invention. Arched or flared sections are generally preferable since they provide a design which is relatively strong and rigid and capable of withstanding the pressure of superimposed material and of fluid pressure from the resulting product stream. The inner and smaller member 12 is indicated as being fabricated of a screen or mesh, however, such member may well be designed of perforate metal as long as pressure drop is minimized and the design permits a rapid flow and movement of the quench stream into the interior thereof along with the product stream being cooled and quenched. Conversely, the outer and larger perforate member 14 may be made of mesh or screen-like material as long as suitable stiffening means is provided to permit such member to hold the superimposed packing and catalyst over the exterior thereof.

It is also to be noted that two quench inlets and two distributor nozzles 17 are provided in the present embodiment; however, in some operations the use of a single spray nozzle may provide adequate cooling and quenching for the hot vaporous product stream at the outlet. Generally, alloy materials for the interior liner sections and for the perforate members will be utilized to withstand the high temperature conversion conditions; however, reactors operating at lower ranges of temperature, and incorporating a quench section, may well utilize non-alloy sections, or in some instances, non-metals. Further, the number and locations of inlet and outlet nozzles may be other than those illustrated, with, for example, one or more additional reactant inlet nozzles being provided at the upper portion of the chamber. In order to accommodate differential expansions due to high internal operating temperatures of the lined reactor, the present reactor is provided with special expansible seal means encompassing the inner ends of inlet lines 19 to preclude the passage of the product stream and quench medium down into the insulation 11. One particularly desirable arrangement at each inlet, as shown in the drawing, provides an elongated tubular member 23 spaced concentrically around inlet pipe 19 and extending for the full length thereof from flange 21 through an opening in liner 7 to the inner end of a bellows type of member 18. The latter connects to and seals with both the end of the tube 23 and the liner 7 to provide a fluid seal while permitting longitudinal expansion movement and/or translation of such members. The length of seal members 18 and their size or number of corrugations may be varied in accordance with the temperature differentials and extent of movement to be encountered in a particular processing service. The bellows members 18 are also preferably made of alloy where line 7 is of alloy.

We claim as our invention:

1. A lined reactor for treating a fluid stream in the presence of a retained solid particulate material and having a quench section, which comprises, in combination, an outer pressure-tight vertically elongated housing having an upper fluid inlet and a lower fluid outlet in the lower end of said housing, an interior metal wall liner attached to and spaced from the interior wall of said housing and having fluid passageway sections to said fluid inlet and to said fluid outlet, insulating material filling the space between said interior wall and said liner, a perforate frusto-conically shaped member mounted within the housing directly over the passageway to said fluid outlet, a second and larger perforate frusto-conically shaped member spaced from and positioned over and encompassing said first mentioned perforate member and said outlet, a bed of solid particles supported on said second perforate member, at least one fluid distributing spray member positioned between said perforate members to direct the entire quenching fluid into the space between said perforate members and upwardly against said second perforate member over substantially the entire inner periphery thereof such that a resulting mixed fluid phase descends uniformly down around the periphery of the encompassed member, a quench fluid conduit means through said housing and connected to said fluid distributing member whereby a quenching fluid may be intermixed with the fluid passing through said perforate members to said fluid outlet.

2. The reactor of claim 1 further characterized in that said second perforate member has its perforations uniformly spaced and sized to preclude the passage of the solid particulate material therethrough and to maintain and support such material above and out of communication with said fluid outlet, a tubular fluid tight liner means extends from said reactor housing inwardly through an enlarged hole in said insulating liner and to a short distance interiorly thereof, and an expansible liner seal member is connected between the interior end of said tubular liner means and the periphery of the hole in said insulating liner, whereby expansion movement and translation between such liner means may be accommodated.

(References on following page)

References Cited by the Examiner

UNITED STATES PATENTS

| | | | |
|---|---|---|---|
| 2,292,716 | 8/1942 | Pyzel | 23—288 X |
| 2,452,569 | 11/1948 | Houdry. | |
| 2,483,923 | 10/1949 | Morrey | 23—288 X |
| 2,483,948 | 10/1949 | Underwood | 23—288 |
| 2,558,194 | 6/1951 | Orescan. | |
| 2,632,692 | 3/1953 | Korin et al. | 23—288 |
| 2,634,194 | 4/1953 | Nebeck | 23—288 |
| 2,901,332 | 8/1959 | Randall. | |
| 3,051,561 | 8/1962 | Grimes | 23—288 |

MORRIS O. WOLK, *Primary Examiner.*